Patented July 31, 1951

2,562,205

UNITED STATES PATENT OFFICE 2,562,205

PROCESS OF PRODUCING OXIMES

Alois Novotny, Zlin, and Otto Wichterle, Prague, Czechoslovakia, assignors to Silon, narodni podnik, Plana nad Luznici, Czechoslovakia No Drawing. Application June 30, 1947, Serial No. 758,209. In Germany March 26, 1942

1 Claim. (Cl. 260—566)

It is known to produce oximes by the treatment of solutions of alkaline hydroxylaminsulphonates with aldheydes or ketones respectively. The solution of an alkaline hydroxylaminsulphonate is obtained by bringing bisulphite and sulphur dioxide into reaction with an aqueous solution of alkaline nitrite. By hydrolysis the disulphonate is converted at first into the monosulphonate and finally, into the hydroxylaminsulphate. For a perfect hydrolysis it is however necessary to heat the solution to 90° C. for a rather long period of time. According to literature this hydrolysis took place in the presence of oxo-compounds at 70° C. (J. Am. Chem. Soc. 46, page 1290–1293, ibidem 45, pages 188–189, also Organic Synthesis collect. vol. I, pages 311–314).

According to the invention the reaction of oxo-compounds (aldehydes and ketones) with solutions of hydroxylaminsulphonates is carried out at temperatures under 70° C., preferably at between 20° and 30° C. In this way not only a saving of heating is secured, but also an increased yield and an improved purity of the produced oxime. At the same time the use of solvents can be dispensed with, the recovery of which complicates the production. The process according to the invention, so far as it is possible to establish, is suitable for every oxo-compound. The fact that a perfect reaction often takes place, and this with an excellent yield, even already at 0° C., is unexpected. The hydrolysis of the hydroxylaminsulphonate to the hydroxylaminsulphate, which is absolutely indispensable for the building of oximes, takes place at 90° C. only and the lowest reaction temperature in the presence of oxo-compounds is 70° C., as mentioned above. In fact, such an elevated temperature is rather injurious and the reaction, according to the invention, takes place at lower temperatures in a more favourable manner.

A further object of the invention is isolation of oxime from a reaction solution by means of a partial neutralization, so that the oxime is precipitated out of the acid solution at pH4.5 to 6, preferably at pH5.

The invention relates furthermore to the use of carbonates or bicarbonates respectively for a partial neutralization of the reaction solution whereby the isolation of the oxime is facilitated in an unexpected manner. The carbon dioxide that develops forms with the oxime a dense foam which may be easily separated from the lower mother liquor, containing dissolved Glauber salt.

The process is carried out in the following way: First of all a solution of hydroxylaminsulphonate is prepared. For this purpose for instance 840 grams of technical sodium nitrite is mixed with 7 kilograms of split ice to a paste. Then a solution of bisulphite, obtained by saturation of a solution of 660 grams of sodium carbonate (waterfree) in 2 litres of water with sulphur dioxide is added. Within a period of 40 minutes the whole amount of the bisulphite solution is added. Thereafter the sulphur dioxide is led in until the brown colour disappears and the acid reaction on kongo takes place. This is done while the reaction mixture is continuously agitated and while the temperature is held under 0° C. after 6.3 kilograms of ice are added. After 2 hours the saturation is completed. The solution the temperature of which amounts to $-2°$ C., is filtered and used to prepare different oximes in the following examples.

Example 1

860 cubic centimetres of hydroxylaminsulphonate solution, prepared in the above described way, is shaken out at 5° C. together with 45 grams of cyclohexanone for such a period of time as make to disappear the two layers built before. On the following day the solution is neutralized by soda to the value of pH5. The precipitated cyclohexanonoxime is filtered and washed out up to make the $SO_4''$-reaction disappear. The filtrate together with the washing waters are shaken out six times, every time with 25 cubic centimetres of chloroform. The extract is dried by waterfree sodium sulphate, filtered and the chloroform is driven away by use of a column. The remaining oxime is added to the main yield and distilled in vacuo. The yield amounts to 94 per cent of theory.

Example 2

The process is carried out in the same way, except that the addition of cyclohexanone takes place at 25° C. At first the reaction solution grows warm so that it has to be cooled moderately in order to keep the temperature under 50° C. On the following day the cyclohexanonoxime is obtained in the same way in a very pure state and the yield amounts to 93 per cent of theory.

Example 3

850 cubic centimetres of hydroxylaminsulphonate solution (17° C.) is shaken out together with 42 grams cyclopentanone (boiling point 125–126° C.) for such a period of time as to make the two already built layers built disappear. The solution is neutralized by soda to pH5. The eliminated cyclopentanonoxime is filtered and washed out up to make the $SO_4''$-reaction disappear. The filtrate together with the washing waters are shaken out six times, every time with 20 cubic centimetres of ether. The ether extract is dried by means of calcined sodium sulphate, and is filtered and the ether is driven off by use of a column. The remaining cyclopentanonoxime is redistilled in vacuo together with the main yield. The boiling point of the oxime obtained is 88–89° C., at 11-9 mm. Hg. The yield amounts to 96 per cent of theory.

*Example 4*

170 cubic centimetres of the solution of hydroxylaminsulphonate (30° C.) is shaken together with 11.2 grams of cyclopeptanone for such a period of time to make disappear the two layers. On the following day the mixture is neutralized by soda to pH5 and shaken out five times, every time together with 30 cubic centimetres of ether. The etheric extract is treated exactly in the same way as mentioned in the foregoing Example 3. After the ether is driven off, there remains in the still suberonoxime, which crystallizes out, after having been cooled with ice. The melting point of the product is 23° C. The yield is 92 per cent of theory.

We claim:

A process of producing cyclohexanonoxime by treatment of cyclohexanone with an aqueous solution of hydroxylaminsulphonate in which the reaction is carried out at temperatures between 0° and 50° C.

ALOIS NOVOTNY.
OTTO WICHTERLE.

REFERENCES CITED

The following references are of record in the file of this patent:

UNITED STATES PATENTS

| Number | Name | Date |
|---|---|---|
| 2,270,204 | Schlack | Jan. 13, 1942 |

OTHER REFERENCES

Meyers et al.: "J. Am. Chem. Soc."; vol. 45 (1923) pp. 188–189.

Semon et. al.: "J. Am. Chem. Soc."; vol. 46 (1924) pp. 1290–1293.

Semon: "Organic Syntheses"; Collective, vol. I (1932) pp. 311 to 313.

Eck et. al.: "Organic Syntheses"; vol. XIX (1939) pp. 20–21.